Feb. 15, 1938.  A. W. LE FEVRE  2,108,342
DIAL FOR INDICATING INSTRUMENTS
Filed Sept. 12, 1933  3 Sheets-Sheet 3
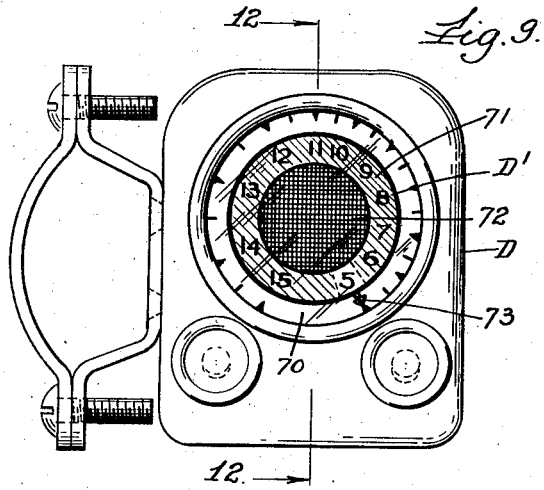
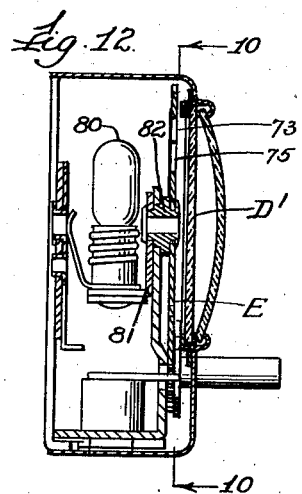
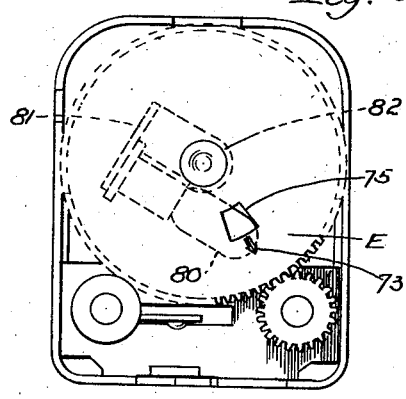
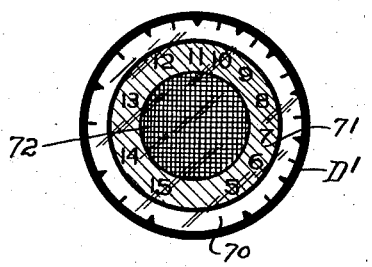
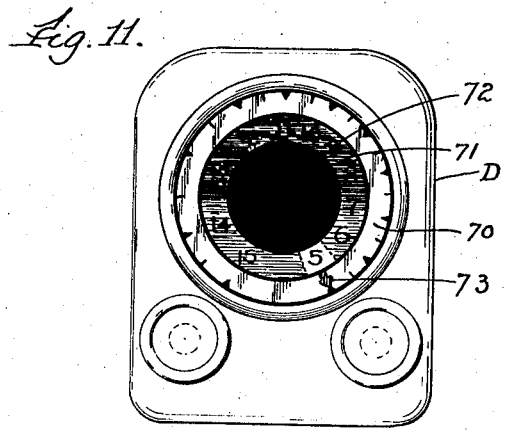
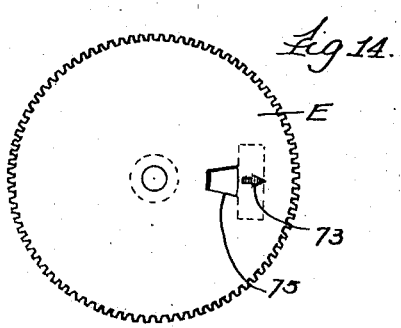
Inventor.
Arden W. LeFevre.
by Burton Burton
his Attorneys.

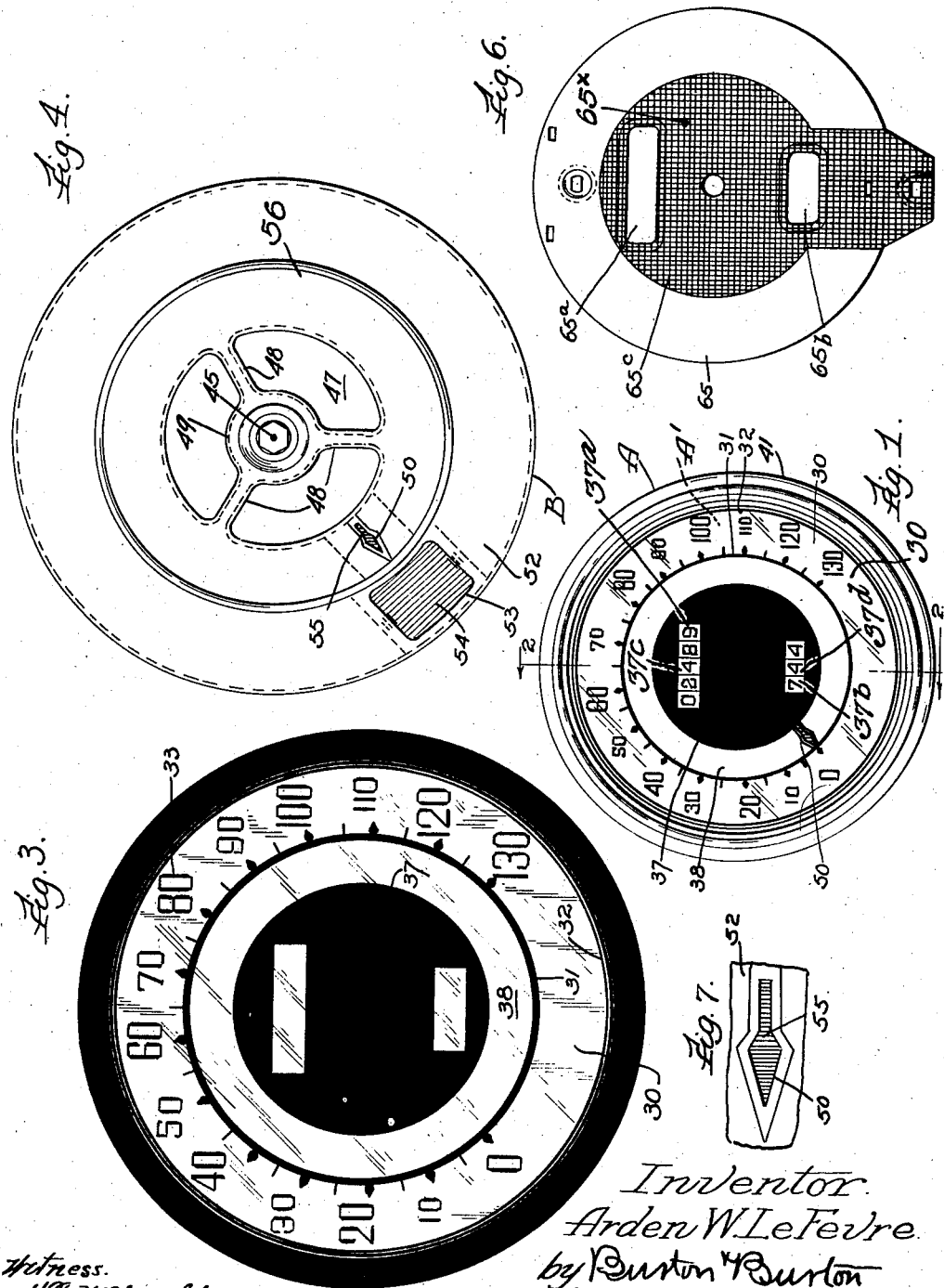

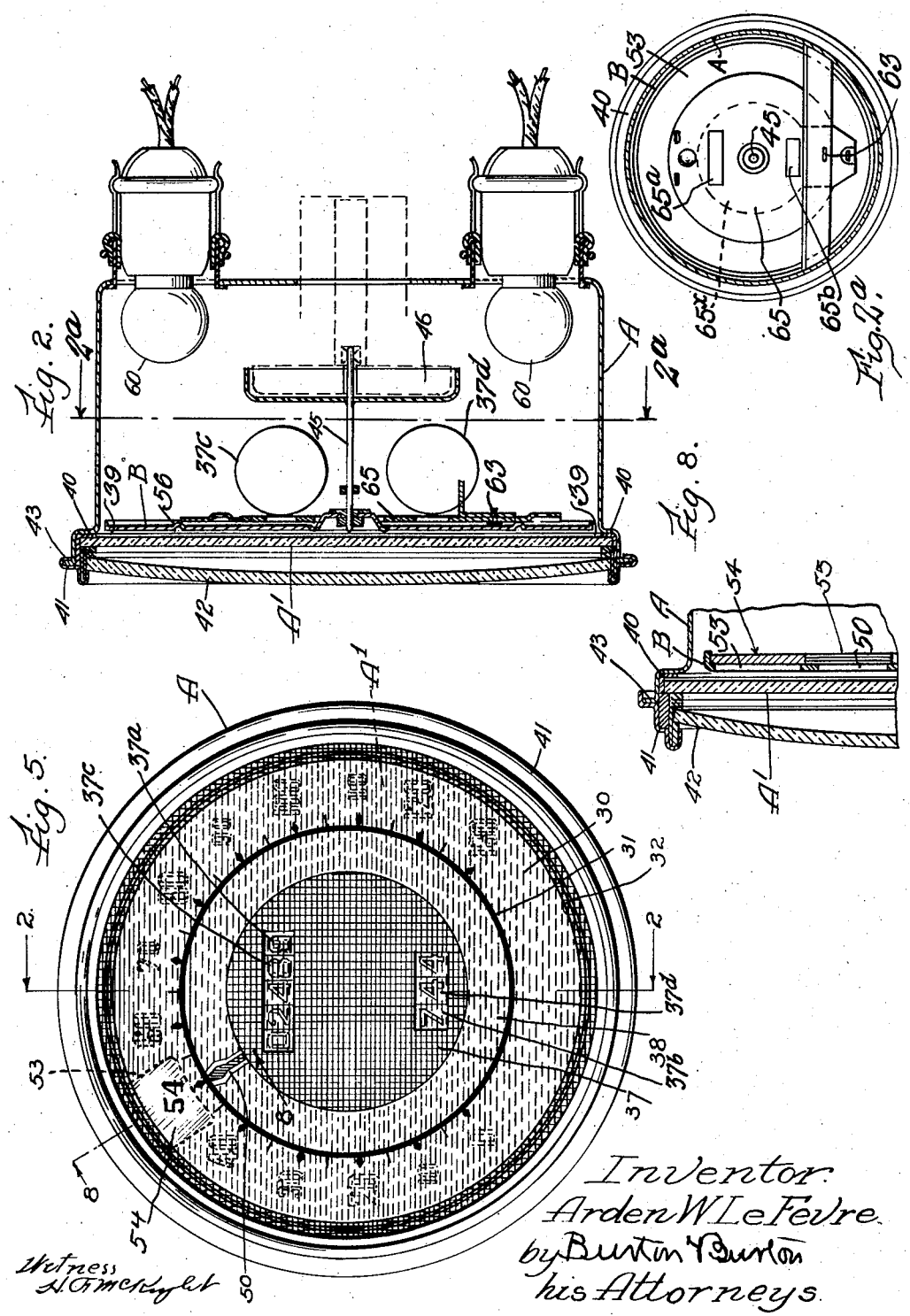

Patented Feb. 15, 1938

2,108,342

UNITED STATES PATENT OFFICE 2,108,342

DIAL FOR INDICATING INSTRUMENTS

Arden W. Le Fevre, Chicago, Ill., assignor to Stewart-Warner Corporation, Chicago, Ill., a corporation of Virginia Application September 12, 1933, Serial No. 689,103

2 Claims. (Cl. 116—129)

The purpose of this invention is to provide a dialed instrument with an indicator dial adapted to be illuminated from the interior at the point of the graduated element at which the index element is registered with the indicating graduations, and having interior illuminating means; whereby the indication of the dial can be read at night without having the aid of exterior illuminating means.

Other specific and collateral purposes are indicated in the specification.

The invention consists in the elements and features of construction shown and described as indicated in the claims.

In the drawings:

Figure 1 is a face view of an instrument of the character of a combined speedometer and odometer having its speed-indicating dial element constructed and arranged for embodying this invention.

Figure 2 is a section at the line 2—2 on Figure 1.

Figure 2ª is a section at the line 2ª—2ª on Figure 2, on a reduced scale.

Figure 3 is a face view of the fixed element of the dial having the graduations.

Figure 4 is a face view of the oscillating or rotary element having the reading index.

Figure 5 is a view similar to Figure 1, but showing the graduations as they may be presumed to appear in the absence of daylight or exterior illumination, and when the interior illuminating lamp is energized, that is, imperfectly readable as indicated by the delicate delineation of the graduation numeral markings contrasted with the bold line delineation of the illuminated graduation numeral with which the index is registered.

Figure 6 is a face view of a shield interposed behind the oscillatory or rotary element for certain purpose hereinafter explained.

Figure 7 is a detail view of an index arrow head.

Figure 8 is a section at the line 8—8 on Figure 5, having the part, B, exaggerated as to thickness so that certain cross-hatching may be readable for indicating color.

Figure 9 is a face view of the control device of a radio-receiving instrument embodying this invention, the dial graduations including numeral designations of sending stations with which the radio-receiving instrument is to be tuned.

Figure 10 is a face view of the same with the bezel and crystal and fixed element of the dial removed, as at a plane indicated by the line 10—10 on Figure 12.

Figure 11 is a face view of the same, similar in characteristic to Figure 5, that is, showing the instrument seen in Figure 9 under the conditions defined in the description of Figure 5.

Figure 12 is a section at the line 12—12 on Figure 9.

Figure 13 is a face view of the fixed element shown in Figure 9.

Figure 14 is a face view of indicator disk of the instrument shown in Figure 9.

Referring to the drawings in detail, and first to the figures showing the embodiment of the invention in a speedometer.

The instrument casing is seen indicated in entirety at A, with the face plate, A¹, constituting the fixed element of the dial made of transparent material, as glass, having an annular zone, 30, of its surface defined between inner and outer concentric circles, 31 and 32, at which said face plate is rendered thoroughly opaque by suitably dark colored surfacing coating applied to the inner surface of the face plate, said zone, 30, being rendered translucent by suitable light-colored coating applied to the inner surface. The translucent zone, 30, carries the speed graduations, seen at 33, at the inner circumference of said zone, and thus at the inner circle, 31, above mentioned, and in said translucent zone are seen the numeral markings indicating miles per hour of speed from zero to 130. A central circular area of the face plate, indicated at 37, is rendered completely opaque (except as to openings in the opaque coating hereinafter mentioned) by suitable dark coating applied to the inner surface of said central area; and there is thus defined between said inner circular area and the translucent zone, 30, a transparent annular zone, 38. The openings in the opaque coating above referred to, seen at 37ª and 37ᵇ, are necessary for exposing the odometer mileage travel readings of the elements 37ᶜ and 37ᵈ. These odometer elements are also seen in their circular outline in Figure 2.

The face plate, A¹, is shown held in fixed position on the front shoulder, 40, of the casing by being clamped thereon at the outer circumferential margin of said face plate by the bezel, 41, which carries the front glass closure plate or crystal, 42, and which is clamped to the outwardly protruding flange, 43, of the casing in the familiar manner of such instruments.

The oscillating element of the dial is seen at B, carried by the spindle, 45, of the spring-resisted oscillator of the speedometer which may be understood to be of the magnetic type, in which the oscillator is the magnetic drag element, seen at 46.

The oscillating dial element, B, which is light colored as to its front face, has a central opening indicated at 47, rendering it annular with radial spokes, 48, connecting its annular part with the central hub, 49, by which it is mounted on the spindle, 45, as described; and it is positioned back of the graduated fixed element, A¹, and spaced therefrom as seen at 39 in Figure 2 sufficiently to ensure freedom from frictional contact therewith, and for the further purpose hereinafter explained of having the advantage of the light color of the oscillating element for diffusing the interior illumination as hereinafter described. At the proper point in the annular zone of the oscillating element, B, which is behind the transparent zone, 38, of the fixed element, A¹, the element, B, carries an index mark shown in the form of an arrow head, 50, for daylight reading on the graduated dial element of the indication of the instrument according to the registration of said index mark with the graduation of the fixed element, and in the zone, 52, of the oscillating element outside said first mentioned zone and coinciding with the translucent zone 30 of the fixed element, A¹, said oscillating element has a window or light-transmitting opening, indicated at 53, which may be closed by a transparent pane indicated at 54, preferably colored any color, shown colored green; and within the surface area defined by the outline of said arrow head index mark the oscillatory element has a second light-transmitting aperture closed by a transparent pane, 55, shown colored red.

Within the casing at positions available by reason of being unoccupied by the speedometer and odometer mechanisms and clear of mechanism between such location and the oscillating dial element there are mounted illuminators,— as illustrated two,—which, as shown, are electric lamp bulbs, 60, which, when energized, illuminate the interior of the casing; and from these illuminators some light passes, as above mentioned, at 39, to the space between the member B and the face plate A¹, defined by the translucent zone 30 of the face plate, and at the same time said illuminators cast a beam of light through the window, 53, of the oscillatory element, B, rendering the area of that window prominently luminous behind the graduations and numeral graduation markings of the fixed element, A¹, as the window is carried in the oscillation of the oscillatory element past the successive graduation markings; and by this means the illuminated window becomes the index cooperating with the graduations for reading the speed indication of the speedometer. Since to enable reading these indications at any and all positions of the oscillating element, the window must have arcuate extent for lapping two consecutive numeral markings, so that at least one of them can be read, and since for accurate reading the registration of the middle point of the arcuate extent of the window with the graduations should be noted, the index mark consisting of the arrow head, 50, is located in radial alignment with the middle point of the arcuate extent of the window, and the illumination described includes a slender beam of light cast through the pane, 55, in the arrow head index mark, and at the same time the reflection afforded by the crystal or front closure glass, 42, illuminates the outline of the arrow head, 50, so that by both illuminations the arrow head is clearly visible for thus locating the registration of the middle point of the window with the graduations.

For the purpose of rendering the illumination of the index arrow through the pane, 55, therein uniform at all positions of the arrow head as it is carried successively into indicating registration with the successive dial markings, there is shown mounted in fixed position behind the oscillating element, B, secured to the casing, as indicated at 63, and spaced back from the element, B, as by the slight bead, 56, protruded from the rear face of the element, B, as seen in Figure 2, a shield plate, 65, peripherally shaped and dimensioned to cover or shield from the beams of light issuing from the lamps, 60, 60, all of the area of the face plate, A¹, within the inner circumference of the translucent zone, 30, of the face plate, said shield having an area, 65ˣ, corresponding to the blackened opaque central area of the face plate and having the area extending radially therefrom between the initial and final graduation markings similarly blackened, the remainder of the forward face of the shield being white. In the central blackened area of the shield there are necessarily provided apertures, 65ᵃ and 65ᵇ, corresponding to the apertures, 37ᵃ and 37ᵇ, of the face plate, A¹, for exposing the odometer mileage travel readings. A further service performed by this shield consists in controlling the light which passes through the apertures 65ᵃ and 65ᵇ and between the circumference of the shield and the bead 56 of the element B, so that this light outlines the arrow-head at its pane, 55, and also illuminates the annular gap between the forward white face of the shield and the rear or inner face of the rotating element B. This light is thus diffused uniformly over the annular path in which the arrow-head is carried by the rotation of the element B.

Referring to the construction shown in Figure 9 in which the invention is embodied in the dial control device of a radio-receiving instrument: The casing is indicated at D, with its face plate, D¹, of transparent material constituting the fixed graduation-bearing dial element. The rotating element having the index for reading the indication according to the registration of the index with the graduations and the graduation numerals is indicated at E.

In this embodiment of the invention the transparent zone, 70, of the fixed graduation-bearing element, D¹, is outside the translucent zone, 71, rendered translucent by a properly thin light-colored coating on the under side; and said fixed element is without apertures at the central area, and at that area, indicated at 72, is rendered completely opaque by opaque dark colored coating on the inner side. The rotating element, E, which has the index arrow head, 73, for cooperating with the graduation numerals, 5 to 15, for reading the indication of the instrument, carries said index mark, 73, in a zone of said rotating element which is behind the transparent zone, 70; and the window indicated at 75 in the rotating element is located in the zone of said element, E, which rotates behind the translucent zone, 71, of the face element; and as in the first described embodiment the rotatable element has its outer surface light colored for diffusing the light admitted through the window, 75, so that the outline of the index arrow-head, 73, which is radially aligned with the middle point of the circumferential dimension of the window, 75, is rendered clearly visible through the transparent zone, 70, of the element, $D^1$, while the particular graduation numeral which happens to be registered with the window, 75, is lighted more brightly than the other numerals of the translucent zone, 71.

In this embodiment the illuminating lamp bulb, 80, is mounted in a suitable bracket member, 81, which is rigid with the hub, 82, of the rotatable element, E, so as to be rotated with the latter for carrying the lamp bulb maintained in position directly behind the window, 75, so that the illumination afforded through the window is equal at all positions of the rotatable element.

I claim:

1. In a dialed instrument, in combination, a casing, cooperating dial elements respectively fixed and rotatable, the fixed element having an annular zone carrying the dial graduations, the rotatable element being an opaque disk carrying an index mark having its terminal portion disposed for registration with the dial graduations, said index mark comprising a light-transmitting aperture in the rotatable element, an illuminating means within the casing, a shield interposed between the illuminating means and the rotatable element and covering the area of said element in which said index mark is located, said shield being spaced back from the rotatable element and having an aperture out of registration with the index mark for admitting light to the inter-space between the shield and the rotatable element, the face of the shield toward the latter being light-colored for diffusing the light over the path of rotation of the index mark.

2. In a speedometer, a dial formed with circularly disposed concentric zones, at least one of said zones being translucent and having graduations thereon, an indicator disk mounted behind the dial and having opaque zones coterminous with the concentric zones on said dial, and a light source behind the indicator disk, the latter having radially spaced indicating windows through which the light source may be directed through the concentric zones in the movement of the indicator disk, one of said windows serving as an index mark, the indicator disk and dial being provided with transparent areas registering with each other to permit the observation of the digits of an odometer.

ARDEN W. LE FEVRE.